United States Patent Office 2,768,078
Patented Oct. 23, 1956

2,768,078

PHOTOGRAPHIC ELEMENTS CONTAINING REACTION PRODUCTS OF POLYVINYLSULFONATES WITH C-AMINO PYRIDINES

Delbert D. Reynolds and William D. Kenyon, Rochester, N. Y., assignors to Eastman Kodak Company, Rochester, N. Y., a corporation of New Jersey No Drawing. Original application September 29, 1951, Serial No. 249,012, now Patent No. 2,701,243, dated February 1, 1955. Divided and this application August 25, 1954, Serial No. 452,198

5 Claims. (Cl. 95—7)

This invention relates to polyvinyl resins, and more particularly to polyvinyl resins containing pyridylamine nuclei, which are suitable as mordants in photographic materials.

The present application is a division of our copending application Serial No. 249,012, filed September 29, 1951 (now United States Patent No. 2,701,243, dated February 1, 1955).

It is known that alkyl and aryl polyvinyl sulfonates can be reacted with primary and secondary amines to give amino derivatives which possess affinity for acids and thereby can function in many instances as mordants. However, the usefulness of such amino derivatives, which are essentially N-substituted polyvinylamines, is quite limited. For example, attempts to use them as mordants in photographic layers have not proven entirely successful, the acid dye compounds tending to diffuse somewhat from desired fixed positions so that poor definition results.

While tertiary amines will also react with alkyl and aryl polyvinyl sulfonates as set forth in our copending application Serial No. 87,577, filed April 14, 1949 (now U. S. Patent No. 2,571,761, dated October 16, 1951), the resulting products consisting essentially of poly-N-vinyl-pyridine quaternary salt units, and tetrahydropyran units in the polymer chain, are water-soluble and considerably less suitable as mordants for fixing acid dyes in photographic layers, but having utility as dispersing agents for silver halides.

We have now found that superior mordants for acid dyes in photographic layers are obtained by reacting alkyl and aryl polyvinyl sulfonates, prepared as described in our patents U. S. 2,531,468 and U. S. 2,531,469, both dated November 28, 1950, under controlled conditions, with C-aminopyridines or alkyl group substituted C-amino-pyridines. The resinous products thus obtained are of a more complex nature than those obtainable when only unsubstituted pyridine or picolines, that is, containing no free amino group substituent are employed. The complete structure of the new N-substituted polyvinylamines of our invention is not known, but evidence indicates that they consist of pyridylamine units and quaternized vinyl sulfonate units along with some vinyl alcohol and cyclic ether units. The sulfur which is always present in our new products is present principally in the form of the quaternized salt units. Two principal reactions have been found to take place:

(1)

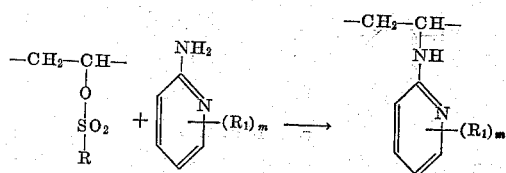

(2)

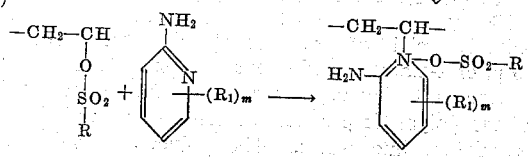

wherein $m$ represents zero, 1 or 2, R represents an alkyl, aralkyl or aryl group (e. g. methyl, ethyl, propyl, butyl, amyl, benzyl, phenyl, etc. groups) and $R_1$ represents an atom of hydrogen or an alkyl group containing from 1 to 5 carbon atoms. The nitrogenous portion of the polymer molecule is represented entirely by the recurring product units represented in structural forms in the above equations. The cyclic ether units present in our new polymers in substantial amount can be represented by the recurring structural unit:

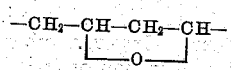

and form part of the linear polymer chain. The presence of the above type of cyclic ether units and the vinyl alcohol units do not materially influence the characteristic properties deriving directly from the presence of the vinyl pyridylamine units and alkyl substituted vinyl pyridyl-amine units and quaternary salt units illustrated in equations 1 and 2.

The above described new class of resins are linear type polymers which are soluble in organic solvents such as methanol, but insoluble in water. However, when $R_1$ is small as in hydrogen or methyl, they are soluble in dilute aqueous acid solutions such as 0.5 to 5% aqueous solutions of mineral and organic acids including hydrochloric acid, hydrobromic acid, phosphoric acid, sulfuric acid, acetic acid, chloracetic acid, etc. However, higher concentrations of the acids can be used to dissolve the resins, if desired. The new polymers readily form substantially water-insoluble salts with water-soluble acid dyes. They are also compatible with colloidal materials such as gelatin. These properties, together with the relatively large molecular dimensions, make the new polymers outstanding mordants for fixing soluble acid dyes such as those employed in photographic layers. They are particularly valuable as mordants in preventing the diffusion of the dyes when incorporated in light filter layers, in backing layers designed to prevent back reflection from the film support and in imbibition printing blanks, where the process involves dye transfer from a tanned gelatin relief to the gelatin-dye mordant composition coated cellulose ester, synthetic resin, paper or similar support. Other colloids such as polyvinyl alcohol can be employed in place of gelatin. Also, other materials can be added to the composition of gelatin-mordant-dye such as silver halide dispersed therein so that there is obtained a material which functions both as a light-sensitive photographic element and as an imbibition blank.

It is, accordingly, an object of the invention to provide a new class of polyvinyl resins containing amino-pyridine nuclei as sidechains. Another object is to provide a photographic element having one or more layers containing the new resins of the invention. Another object is to provide a light filter layer wherein is incorporated one or more resins of the invention. Another object is to provide a backing layer containing a resin of the invention for backing light-sensitive films to prevent back reflection of light from the support. Another object is to provide an imbibition type printing blank containing a resin of the invention. Another object is to provide a light-sensitive photographic layer containing a resin of the invention. Another object is to provide processes for preparing the new resins and the photographic materials. Other objects will become apparent hereinafter.

In accordance with the invention, we prepare our new polyvinyl resins containing aminopyridine nuclei as sidechains by starting with polymers of alkyl and aryl vinyl sulfonates, which compounds are in fact binary copolymers consisting predominantly of vinyl sulfonate units combined with some residual vinyl alcohol units, that is, containing the recurring structural units:

$$-CH_2-CH-$$
$$\phantom{-CH_2-}|$$
$$\phantom{-CH_2-}OSO_2-R$$

$$-CH_2-CH-$$
$$\phantom{-CH_2-}|$$
$$\phantom{-CH_2-}OH$$

wherein R has the previously defined meaning, and reacting the sulfonate with a C-aminopyridine or a C-aminopyridine having one or two alkyl group substituents on nuclear carbon atoms and, on completion of the reaction, precipitating the reaction mixture into a non-solvent liquid such as water. However, other appropriate and common means for separation of resinous products from reaction mixtures can also be employed. The product obtained is then further purified by redissolving in methanol, adjusting the pH to approximately 9 with an alkaline material (e. g. aqueous or alcoholic sodium or potassium hydroxide) and reprecipitating into water and drying. The proportion of reactants can be varied quite widely, but the C-aminopyridine or C-alkyl substituted aminopyridine is generally employed equal to or in excess of stoichiometric proportions, from 1 to 15 mol of the particular aminopyridine to each mol of the particular polyvinyl sulfonate. The temperature of the reaction can vary from 60° C. to the boiling point of the reaction mixture, but preferably from 60° to 100° C. for the best results. Advantageously, the reaction can be carried out in an inert diluent or mixtures of inert diluents such as in chloroform, acetone, etc. The aqueous or alcoholic alkali hydroxide solution functions to neutralize the sulfonate groups liberated in the reaction and, accordingly, need be present only to a slight excess although larger amounts are not harmful. The proportion of effective units in our new class of polymers range from 40% to 60% by weight of quaternary salt units and from 6% to 24% by weight of vinyl pyridylamine or vinyl C-alkyl substituted pyridylamine units, the remainder of the polymer being cyclic ether units and some residual vinyl alcohol units.

Suitable aminopyridines and C-alkyl substituted aminopyridines include 2-aminopyridine, 4-aminopyridine, the aminopicolines such as 2-amino-3-methylpyridine, 2-amino-4-methylpyridine, 2-amino-5-methylpyridine, 2-amino-6-methylpyridine and corresponding 4-amino methyl derivatives which react in this reaction in exactly the same way, 2-amino-6-ethylpyridine, 2-amino-6-butylpyridine, 2-amino-6-amylpyridine, etc., the various aminolutidines such as, for example, 4-amino-2,6-dimethyl pyridine and the various aminocollidines such as, for example, 2-amino-3-ethyl-4-methylpyridine, etc.

The following examples will serve to illustrate further our new class of polymers and the manner of their preparation.

EXAMPLE 1

1200 g. of polyvinyl benzene sulfonate containing 83.4% by weight of vinyl benzene sulfonate units, and 16.6% by weight of vinyl alcohol units, were stirred with 5800 g. of 2-amino pyridine on a steam bath for 21 hours. The reaction mixture was cooled and poured into water. The polymer which separated was redissolved in methanol and precipitated by pouring the solution into dilute aqueous sodium hydroxide solution. The resinous precipitate was then leached in water, dissolved in methanol, the solution filtered and precipitated into ether and the precipitate dried. It was soluble in dilute 1% aqueous hydrochloric acid. Analysis of the product gave by weight 5.0% sulfur and 9.2% nitrogen, corresponding to a calculated content therein of approximately 20.6% by weight of vinyl-N-(2-pyridyl) amine units and approximately 43.4% by weight of N-vinyl-2-amino pyridinium benzene sulfonate units, the said units having the structures

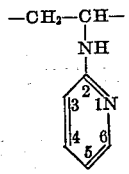 and 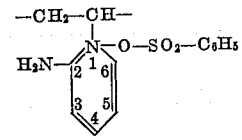

EXAMPLE 2

1900 g. of polyvinyl benzene sulfonate, containing 84% by weight of vinyl benzene sulfonate units and approximately 16% by weight of vinyl alcohol units and only a trace of chlorine, were dissolved in 6 liters of chloroform containing 2700 g. of 2-aminopyridine. The reaction was heated on a steam bath (60° to 100° C.) for 20 hours, the chloroform being allowed to distill out during this time. An equal volume of methanol was added and the polymer was separated by precipitation of the solution in water. It was redissolved in methanol, the pH of the solution adjusted to 10 with alcoholic sodium hydroxide and again precipitated in water. Further purification was effected by trituration of the resin in water at 60°–65° C. Analysis showed it to contain vinyl N-(2-pyridyl)amine and quaternary salt units in approximately the same proportion as the resin of Example 1. The resin, obtained as above, was dissolved in 250 cc. of glacial acetic acid plus 1 liter of water to give 3047 g. of solution with a solid content of 35% (1080 g. solid) and having a pH of 4.2. This solution was incorporated into various light-sensitive gelatino-silver halide emulsions and proved to be an unusually effective mordant.

EXAMPLE 3

100 g. of polyvinyl benzene sulfonate, containing 83.4% by weight of vinyl benzene sulfonate units and 16.6% by weight of vinyl alcohol units, were dissolved in a mixture of 300 cc. of chloroform and 125 g. of 2-amino-3-methylpyridine. The reaction mixture was heated on a steam bath (60°–100° C.) for a period of 20 hours, during which time the chloroform was allowed to distill out. Residual chloroform was removed under vacuum. The reaction product was dissolved in 150 cc. of methanol and the polymer was separated by precipitation of the solution in water. In was then redissolved in methanol, the pH adjusted to 9 by alcoholic potassium hydroxide and the polymer again isolated by precipitating in water. The product was then dissolved in 100 cc. of methanol, the solution filtered and precipitated in a 2:1 mixture of ether and ethanol. The polymer was light yellow and became granular on drying. It was soluble in 1% aqueous hydrochloric acid. Analysis of this product gave by weight 6.0 % of sulfur and 7.4% of nitrogen, corresponding to a calculated content therein of approximately 10% by weight of vinyl N-(2-(3-methyl)-pyridyl) amine units and approximately 55% by weight of N-vinyl-2-amino-3-methyl pyridinium benzene sulfonate units, the said units having the structure

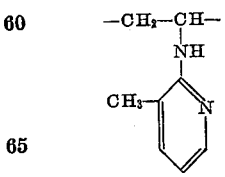 and 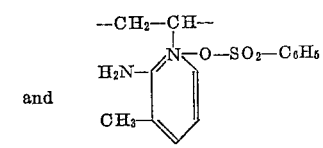

EXAMPLE 4

100 g. of polyvinyl benzene sulfonate containing 83.4% by weight of vinyl benzene sulfonate units and 16.6% by weight of vinyl alcohol units were stirred with 500 g. of 2-amino-4-methyl pyridine on a steam bath for a period of 20 hours. The reaction mixture was cooled and the polymeric product separated by precipitation of the mixture into water. The polymer obtained was redissolved in methanol and sufficient 10% aqueous sodium hydroxide solution added to give a pink color to the solution with phenol-phthalein indicator. The solution was then filtered and poured into a larger volume of water. The polymer which separated was washed with water and dried. It was soluble in dilute mineral acids and on analysis gave by weight 5.9% of sulfur and 9.1% of nitrogen, corresponding to a calculated content therein of approximately 19% by weight of vinyl N-(2-(4-methyl)pyridyl)amine units and approximately 54% by weight of N-vinyl-2-amino-4-methyl-pyridinium benzene sulfonate units, the said units having the structures

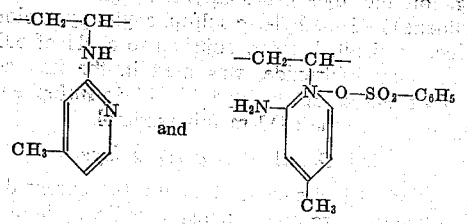

EXAMPLE 5

100 g. of polyvinyl benzene sulfonate containing 83.4% by weight of vinyl benzene sulfonate units and 16.6% by weight of vinyl alcohol units were stirred with 500 g. of 2-amino-5-methyl pyridine and heated at 90° to 100° C. on a steam bath for 20 hours. The reaction mixture was cooled and the polymeric product precipitated in water. The polymer was redissolved in methanol and sufficient 10% aqueous sodium hydroxide added to give a pink color to phenolphthalein indicator. The resulting solution was poured into ether. The polymer which separated was washed and dried. It was soluble in 1% aqueous hydrochloric acid and on analysis was shown to contain by weight 5.9% of sulfur and 8.9% of nitrogen, corresponding to a calculated content therein of approximately 18% by weight of vinyl N-(2-(5-methyl)pyridyl)amine units and approximately 54% by weight of N-vinyl-2-amino-5-methylpyridinium benzene sulfonate units, the said units having the structures

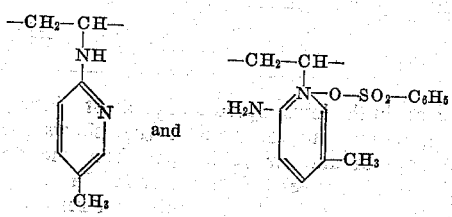

EXAMPLE 6

100 g. of polyvinyl benzene sulfonate, containing 83.4% by weight of vinyl benzene sulfonate units and 16.6% by weight of vinyl alcohol units, were dissolved in a mixture of 300 cc. of chloroform and 125 g. of 2-amino-6-methylpyridine. The reaction mixture was heated on a steam bath (60°–100° C.) for a period of 20 hours, during which time the chloroform was allowed to distill out. Residual chloroform was removed under vacuum. The reaction product was dissolved in methanol and the polymer separated by precipitation of the solution in water. It was redissolved in methanol, the pH adjusted to 9 by alcoholic potassium hydroxide and the polymer again isolated by precipitating in water. It was then redissolved in methanol, the solution filtered and precipitated in a 2:1 mixture of ether and ethanol. The polymer was light yellow and became granular on drying. It was soluble in 1% aqueous hydrochloric acid. Analysis of this product gave by weight 5.9% of sulfur and 8.3% of nitrogen, corresponding to a calculated content therein of approximately 15% by weight of vinyl N-(2-(6-methyl)pyridyl)amine units and approximately 54% by weight of N-vinyl-2-amino-6-methyl-pyridinium benzene sulfonate units, the said units having the structures

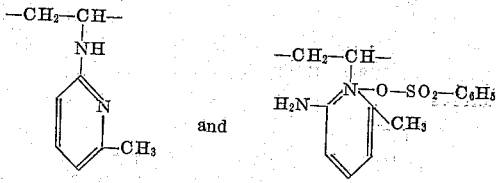

EXAMPLE 7

300 g. of sodium amide were ground in a mortar with 450 g. of 2-n-amylpyridine. The mixture was heated at about 125° C. and stirred for 8 hours. The cooled mixture was hydrolyzed with ice water. An excess of sodium hydroxide was added and the top layer separated. The bottom layer was extracted with benzene and the benzene extract combined with the original top layer. After drying over anhydrous calcium chloride, the benzene was removed by distillation and the reaction product distilled under vacuum without fractionation. The crude material was then purified by fractional distillation. There was obtained a fraction of 200 g. boiling at 96° C./ 0.5 mm. Analysis of this fraction gave by weight 73.4% carbon, 9.5% hydrogen and 16.5% nitrogen (compared with calculated theory of 73.1% C., 9.7% H and 17.0% N) indicating thereby that practically pure 2-amino-6-amylpyridine had been obtained.

8 g. of polyvinyl benzene sulfonate were dissolved in 50 cc. of chloroform containing 25 g. of 2-amino-6-amylpyridine (prepared as above described). The reaction mixture was heated for 16 hours on a steam bath (60°–100° C.) and the chloroform allowed to distill. The polymer was precipitated in ether and then redissolved in methanol. The pH of the solution was adjusted to 9 and the polymer was separated by precipitation in water. It was again dissolved in methanol and precipitated in water. The light brown polymer obtained was insoluble in dilute acetic acid. Analysis corresponding to a calculated content therein of approximately 8% by weight of vinyl N-(2-(6-amyl)pyridyl) amine units and approximately 54% by weight of N-vinyl-2-amino-6-amyl-pyridinium benzene sulfonate units, the said units having the structures

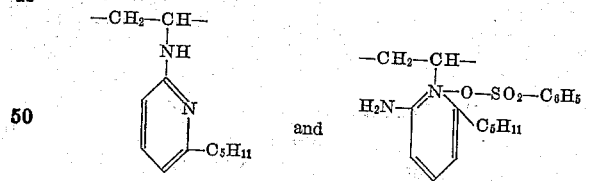

By substituting the 2-n-amylpyridine in the above example with various other 2-n-alkyl pyridines, there can be prepared generally similar polymers characterized by containing the corresponding vinyl N-2-amino-alkyl pyridine units.

EXAMPLE 8

17 g. of polyvinyl benzene sulfonate, containing 83.4% by weight of vinyl benzene sulfonate units and 16.6% by weight of vinyl alcohol units, and 25 g. of 2-amino-4,6-dimethyl pyridine were dissolved together in 100 cc. of chloroform. This reaction mixture was heated for 15 hours on a steam bath, during which time the chloroform was allowed to distill. The resinous product was isolated by precipitation into water. It was then dissolved in methanol. The solution was filtered, the pH adjusted to 9.5 with alcoholic potassium hydroxide and again poured into water. The dried polymer was again dissolved in methanol, precipitated in a 1:1 mixture of alcohol-ether and hardened by leaching in ether. The resulting light yellow brittle polymer which was water-insoluble but soluble in dilute aqueous acids, contained 7.5% by weight of nitrogen and 5.5% by weight of sulfur, corresponding to a calculated content therein of approximately 13% by weight of vinyl N-(2-(4,6-dimethyl)pyridyl) amine units and approximately 53% by weight of N-vinyl-2-amino-4,6-dimethyl pyridinium benzene sulfonate units, the said units having the structures

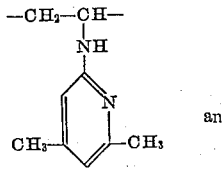 and 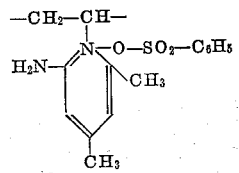

EXAMPLE 9

This example illustrates the effectiveness of the new polyvinyl resins of the invention as mordants in photographic filter and backing layers to prevent diffusion of the dye from such layers into overcoating layers.

(a) Gelatin-dye layer

To 4540 g. of an aqueous gelatin solution containing 10% by weight of dry gelatin, there was added enough distilled water to bring the weight to 15 pounds and the mixture heated to 40° C. Next, there was added with stirring 120 cc. of an aqueous 8% saponin solution, then there was added with stirring a solution containing 34 g. of bis [1-(p-sulfophenyl)-3-methyl-5-pyrazolone (4)] methine oxonol dissolved in 1000 cc. of distilled water and adjusted to a pH of 5.0 with dilute sodium hydroxide, and then there was added with stirring 120 cc. of an aqueous 1.5% diacetyl solution. The pH of the whole mixture was adjusted to 5.0 with dilute sodium hydroxide and sufficient distilled water mixed therewith to make a total of 20 pounds. The completed mixture was then coated on a clear safety film support at the rate of 0.04 pound of the mixture per square foot of film support. After curing, the coated side of the film support was overcoated with a bromoiodide emulsion of the type described by Trivelli and Smith, Phot. J. 79 330–338 (1939), containing one mole of silver halide and 308 g. of gelatin in a total weight of 9.5 pounds, to which there had been added 120 cc. of aqueous 8% saponin solution, 120 cc. of aqueous 1.7% diacetyl solution and enough distilled water to bring the total weight to 14 pounds. The rate of coating was 0.002 mol of silver halide per square foot of film area.

(b) Gelatin-dye-mordant layer

Another sheet of clear safety film support was coated and overcoated as described in above (a) except that the first coating adjacent to the support contained, in addition to the other ingredients of (a), 64 g. of a polyvinyl resin containing approximately 44% by weight of N-vinyl-2-aminopyridinium benzene sulfonate units and approximately 14% by weight of vinyl N-(2-pyridyl) amine units.

In this case, the resin was added subsequent to the dye but prior to the diacetyl solution. The resin was dissolved in an aqueous solution containing 120 cc. of glacial acetic acid in a total volume of 1600 cc., the solution being first adjusted to a pH of 4.0 with dilute sodium hydroxide.

(c) Photographic testing of products (a) and (b)

The photographic testing of above sensitized products gave the following results, where speeds are expressed as 10/i where i is inertia in meter candle seconds of sunlight quality.

| Product | Speed | Gamma |
|---|---|---|
| (a) | 56 | 1.05 |
| (b) | 135 | 1.39 |

The lower speed and contrast of the product (a), compared with the product (b), shows the effect of diffusion of the yellow dye from the first coat into the gelatin overcoat. In product (b), mordanting of the dye by the polyvinyl resin contained in the first coat greatly reduced the diffusion of the dye into the emulsion coat, which accordingly had higher speed and contrast.

EXAMPLE 10

(a) Gelatin-dye layer

This product is the same as Example 9 (a) except that 7.2 g. of the dye 4-[(3-ethyl-2(3)-benzoxazolylidene (ethylidene)]-3-methyl-1-p-sulfophenyl-5-pyrazolone in 1000 cc. of distilled water, adjusted to a pH of 5.0 with dilute sodium hydroxide, was used in the first coating instead of 34 g. of the dye bis [1-(p-sulfophenyl)-3-methyl-5-pyrazolone (4)] methine oxonol.

(b) Gelatin-dye-mordant layer

This product is the same as above (a) except the first coating adjacent to the support contained, in addition to the other ingredients of (a), 14.4 g. of the same polyvinyl resin as was used in Example 9 (b). In this case, the order of addition was also the same, except that the resin was dissolved first in 30 cc. of concentrated acetic acid and then diluted to 300 cc. with distilled water, then adjusted to pH of 4.0 with dilute sodium hydroxide and finally diluted to a total volume of 350 cc., in which form it was incorporated into the gelatin-dye mixture.

The overcoatings of above products (a) and (b) were carried out with the same emulsions and procedure as described in Example 9.

(c) Photographic testing of products (a) and (b)

The photographic testing of the above sensitized products of this example gave the following results, where speeds are expressed as 10/i, where i is inertia in meter candle seconds of sunlight quality.

| Product | Speed | Gamma |
|---|---|---|
| (a) | 46 | 1.18 |
| (b) | 118 | 1.41 |

Here again the lower speed and contrast of the product (a), compared with the product (b), shows the effect of diffusion of another yellow dye from the first coat into the gelatino-silver halide overcoat. In product (b), mordanting of the dye by the polyvinyl resin contained in the first coat is again shown to reduce greatly the diffusion of the dye into the emulsion overcoating, which latter accordingly had a higher speed and contrast.

EXAMPLE 11

This example illustrates the advantageous results obtained by the incorporation of the new polyvinyl resins of the invention as mordants to prevent dye bleeding in dye transfer processes employing pre-sensitized (silver halide) dye blanks.

(a) Emulsion without mordant

A bromoiodide emulsion of the type described by Trivelli and Smith (see reference Example 9) having a weight of 9.5 pounds per mol of silver halide and containing 308 g. of gelatin was prepared. To this emulsion there was added 44 c. of 50% glycerine solution plus 40 cc. of approximately 6% saponin solution, and after adjustment of the pH to 5.0 with sulfuric acid, there were added 20 cc. of 10% formaldehyde solution and sufficient distilled water to bring the total weight of the mixture to 11 pounds. This mixture was coated at the rate of 0.0038 mol of silver halide per square foot on a clear safety film support.

(b) Emulsion with mordant

Into a bromoiodide emulsion similar to that of above (a), there were incorporated 40 cc. of 50% glycerine solution, 40 cc. of 6% saponin solution and 850 cc. of 4% solution of the same resin as was used in Example 9 (b) in 10% acetic acid adjusted to a pH of 5.0. The pH of the entire mixture was then adjusted to a pH of 5.0. Then 15 cc. of 10% formaldehyde solution and enough distilled water were added to bring the total weight of the mixture to 12.7 pounds per mol of silver. This mixture was also spread on a clear safety film support at the rate of 0.0038 mol of silver halide per square foot of film support.

(c) Imbibition testing

The products of above (a) and (b) were each given suitable pre-conditioning to ensure adequate hardening, and were then processed and tested as dye imbibition blanks. Product (b) containing the new resin as a mordant showed considerably better definition and sharpness of image than product (a) which contained none of the new resin mordanting agent.

EXAMPLE 12

This example illustrates the advantageous results obtained by incorporation of one or more of the polyvinyl resins of the invention as mordants in gel coated supports for use as dye transfer receiving blanks.

(a) Blanks with mordant

To one pound of air-dried gelatin there was added 60 cc. of 50 percent glycerine in water solution, 60 cc. of 6 percent saponin in water solution, 1250 cc. of a 4 percent solution in dilute aqueous acetic acid of a polyvinyl resin containing approximately 44 percent by weight of N-vinyl-2-aminopyridinium benzene sulfonate units and approximately 14 percent by weight of N-(2-pyridyl) amine units. The total weight of the mixture was adjusted to 15 pounds by the addition of distilled water. The pH was adjusted to 5.0, followed by the addition of 30 cc. of 10 percent formalin in water solution as a hardener. The mixture was coated on a clear safety cine support.

(b) Blank without mordant

A mixture was made similar to (a), but without the polyvinyl resin, and similarly coated.

The above coatings were in each case made at the rate of 0.0025 pound of gelatin per square foot. These coatings were conditioned by incubating until hardened, and were then tested in the following manner:

Prior to the yellow dye transfer step, the blanks prepared as above were first soaked for about one minute in a one percent solution of sodium sulfosalicylate, pH 4.9, at 75° F. In the steps of transfers of the cyan and magenta dyes, the blanks were soaked for about one minute in tap water at 75° F. Suitable gelatin relief matrices were dyed with the proper dyes for two minutes, rinsed 15 seconds at 80° F., and laminated in contact with blanks (a) and (b) for two minutes at 110° F. Resolving power test charts showed very much better definition for the blanks (a) containing the polyvinyl resin mordant.

Although the invention has been illustrated with only a limited number of the new resinous polymers of the invention, it will be understood that similarly good mordanting properties are possessed by all the new resinous polymers of the invention, including those which contain 6%, 15%, 18%, 21% or 24% by weight of vinyl pyridylamine or C-alkyl substituted vinyl pyridylamine units and 40%, 45%, 50% or 60 by weight of quaternary salt units. Also, various other sheet materials can be employed as supports for the described photographic materials containing the new resinous polymers of the invention. For example, cellulose esters such as the nitrate, acetate-propionate, acetate-butyrate, etc. and synthetic resins such as polyvinyl acetal, polyvinyl butal, etc. can be employed, and in the case of the gel coated dye transfer blanks, opaque or semi-opaque materials such as pigmented cellulose esters, paper, etc. can also be used.

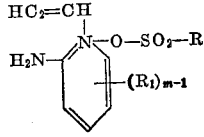

What we claim is:

1. A light-sensitive photographic element comprising a support having thereon at least one silver halide emulsion layer having distributed therein a polyvinyl resin comprising from 6% to 24% by weight of a vinyl pyridylamine having the general formula:

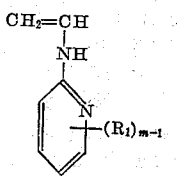

wherein $m$ represents a positive integer of from 1 to 3 and $R_1$ represents a member selected from the group consisting of an atom of hydrogen and an alkyl group containing from 1 to 5 carbon atoms, and from 40% to 60% by weight of a quaternary salt having the general formula:

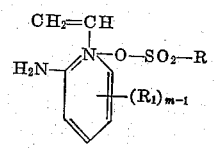

wherein $m$ and $R_1$ have the above definitions and R represents a member selected from the group consisting of an alkyl group containing from 1 to 4 carbon atoms, a phenyl group and a benzyl group, the said polyvinyl resin being prepared by reacting a polymer of a vinyl sulfonate having the general formula:

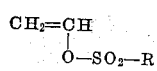

wherein R has the above definition, with an aminopyridine having the general formula:

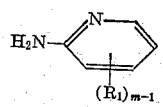

wherein $m$ and $R_1$ have the above definitions, at a temperature of from 60° C. to the refluxing temperature of the reaction mixture at atmospheric pressure in the ratio of from 1 to 15 mol of the said aminopyridine to each mol of the said polyvinyl sulfonate.

2. A light-sensitive photographic element comprising a support having thereon at least two gelatin layers, at least one of said gelatin layers being a silver halide emulsion layer and at least one of said gelatin layers having distributed therein a substantially water-insoluble salt of a water-soluble acid dye with a polyvinyl resin containing from 6% to 24% by weight of a vinyl pyridylamine having the general formula:

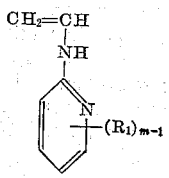

wherein $m$ represents a positive integer of from 1 to 3 and $R_1$ represents a member selected from the group consisting of an atom of hydrogen and an alkyl group containing from 1 to 5 carbon atoms, and from 40% to 60% by weight of a quaternary salt having the general formula:

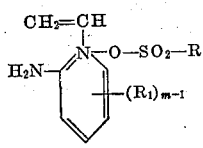

wherein $m$ and $R_1$ have the above definitions and R represents a member selected from the group consisting of an alkyl group containing from 1 to 4 carbon atoms, a phenyl group and a benzyl group, the said polyvinyl resin being prepared by reacting a polymer of a vinyl sulfonate having the general formula:

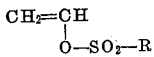

wherein R has the above definition, with an aminopyridine having the general formula:

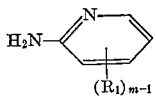

wherein $m$ and $R_1$ have the above definitions, at a temperature of from 60° C. to the refluxing temperature of the reaction mixture at atmospheric pressure in the ratio of from 1 to 15 mol of the said aminopyridine to each mol of the said polyvinyl sulfonate.

3. A light sensitive photographic element comprising a support having thereon at least one silver halide emulsion layer having distributed therein a substantially water-insoluble salt of a water-soluble acid dye with a polyvinyl resin containing from 6% to 24% by weight of vinyl N-(2-pyridyl)amine units and from 40% to 60% by weight of N-vinyl-2-amino pyridinium benzene sulfonate units, the said polyvinyl resin being prepared by reacting a polymer of a vinyl sulfonate having the general formula:

$$CH_2=CH$$
$$|$$
$$O-SO_2-R$$

wherein R represents a member selected from the group consisting of an alkyl group containing from 1 to 5 carbon atoms, a phenyl group and a benzyl group, with 2-amino-3-methylpyridine, at a temperature of from 60° to 100° C., in the ratio of from 1 to 15 mol of the 2-amino-3-methylpyridine to each mol of the polyvinyl sulfonate.

4. A light-sensitive photographic element comprising a support having thereon at least two layers, at least one of said layers being a silver halide emulsion layer and at least one of said layers having distributed therein a substantially water-insoluble salt of a water-soluble acid dye with a polyvinyl resin containing from 6% to 24% by weight of a vinyl pyridylamine having the general formula:

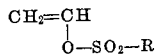

wherein $m$ represents a positive integer of from 1 to 3 and $R_1$ represents a member selected from the group consisting of an atom of hydrogen and an alkyl group containing from 1 to 5 carbon atoms, and from 40% to 60% by weight of a quaternary salt having the general formula:

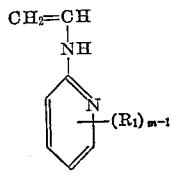

wherein $m$ and $R_1$ have the above definitions and R represents a member selected from the group consisting of an alkyl group containing from 1 to 4 carbon atoms, a phenyl group and a benzyl group, the said polyvinyl resin being prepared by reacting a polymer of a vinyl sulfonate having the general formula:

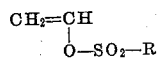

wherein R has the above definition, with an aminopyridine having the general formula:

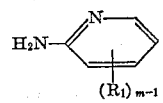

wherein $m$ and $R_1$ have the above definitions, at a temperature of from 60° C. to the refluxing temperature of the reaction mixture at atmospheric pressure in the ratio of from 1 to 15 mol of the said aminopyridine to each mol of the said polyvinyl sulfonate.

5. A light-sensitive photographic element comprising a support having thereon at least one gelatino-silver halide emulsion layer having distributed therein a polyvinyl resin comprising from 6% to 24% by weight of a vinyl pyridylamine having the general formula:

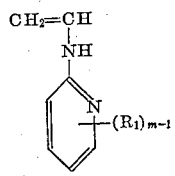

wherein $m$ represents a positive integer of from 1 to 3 and $R_1$ represents a member selected from the group consisting of an atom of hydrogen and an alkyl group containing from 1 to 5 carbon atoms, and from 40% to 60% by weight of a quaternary salt having the general formula:

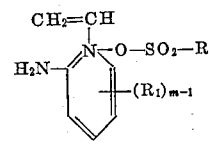

wherein $m$ and $R_1$ have the above definitions and R represents a member selected from the group consisting of an alkyl group containing from 1 to 4 carbon atoms, a phenyl group and a benzyl group, the said polyvinyl resin being prepared by reacting a polymer of a vinyl sulfonate having the general formula:

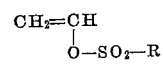

wherein R has the above definition, with an aminopyridine having the general formula:

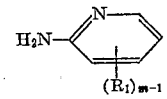

wherein $m$ and $R_1$ have the above definitions, at a temperature of from 60° C. to the refluxing temperature of the reaction mixture at atmospheric pressure in the ratio of from 1 to 15 mol of the said aminopyridine to each mol of the said polyvinyl sulfonate.

References Cited in the file of this patent
UNITED STATES PATENTS 2,701,243   Reynolds et al. _____ Feb. 1, 1955